June 2, 1970     L. H. WESTESSON     3,515,282
FILTERING APPARATUS FOR LABORATORY FILTERING OF LIQUIDS, METHOD
OF MAKING ANCILLARY FILTER CARTRIDGES, AND MOLD FOR
CARRYING OUT THE METHOD
Filed Feb. 28, 1968     3 Sheets-Sheet 1
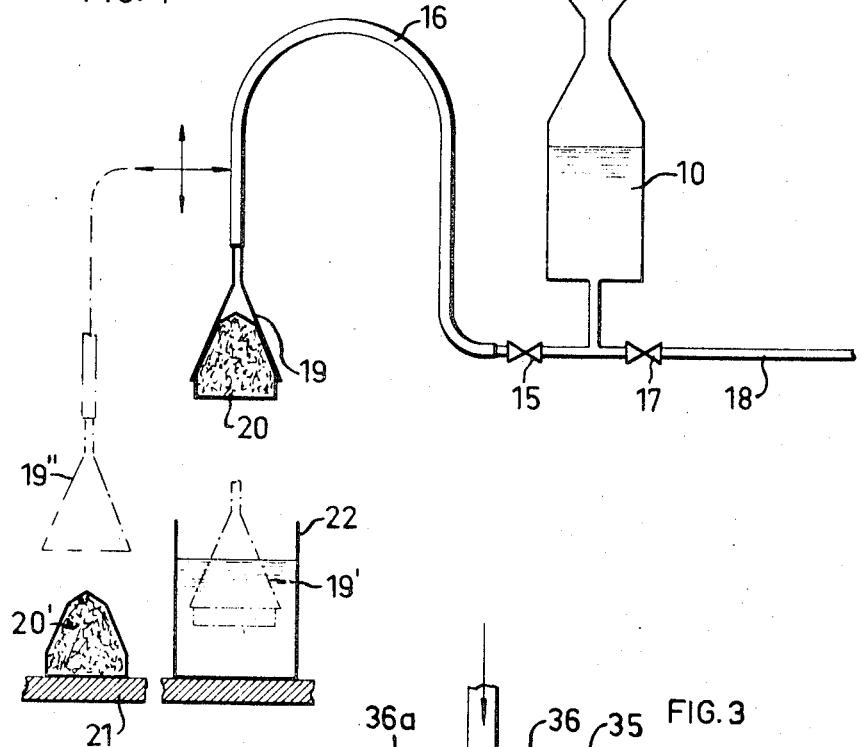
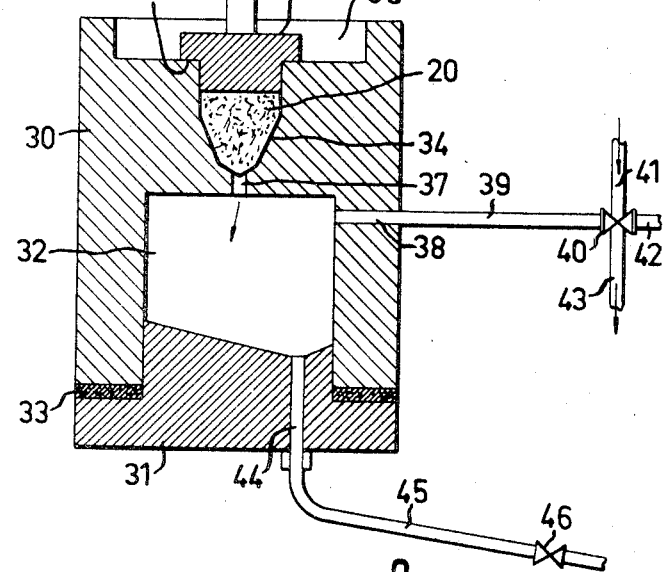

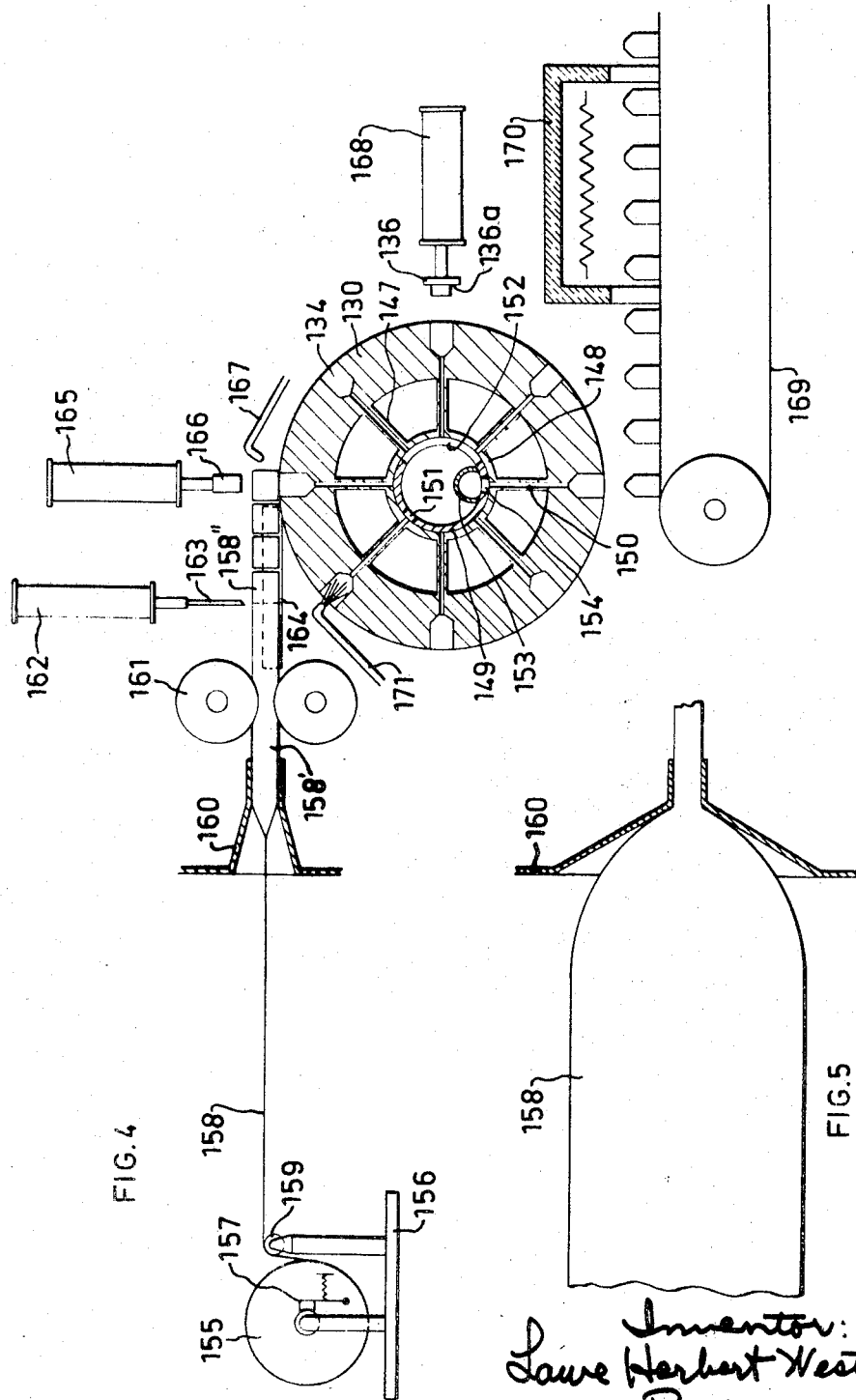

United States Patent Office 3,515,282
Patented June 2, 1970

3,515,282
FILTERING APPARATUS FOR LABORATORY FILTERING OF LIQUIDS, METHOD OF MAKING ANCILLARY FILTER CARTRIDGES, AND MOLD FOR CARRYING OUT THE METHOD
Lawe Herbert Westesson, Arlov, Sweden, assignor to Ingeniorsfirman Nils Weibull A.B., Malmo, Sweden
Filed Feb. 28, 1968, Ser. No. 708,889
Int. Cl. B01d 35/12
U.S. Cl. 210—411                    2 Claims

ABSTRACT OF THE DISCLOSURE

A laboratory filtering apparatus for rapid filtering of liquids to permit performing routine analyses in connection with continuous production, has a compressed cellulose filter cartridge inserted in a suction nozzle for respectively sucking liquid through the filter cartridge and blowing the filter cartridge after single use thereof out of the nozzle. The manufacture of the filter cartridge comprises compressing cellulose in moist condition to a cartridge in a mold while sucking water therefrom, ejecting the cartridge from the mold, and drying the cartridge. A mold for making a filter cartridge of cellulose has a mold cavity which is surrounded at one end by a recess for water to moisten the cellulose in the mold cavity, a plunger to be inserted through said mold end, a chamber communicating with the other mold end having an outlet and means for controlling the pressure in the chamber.

---

This invention relates to a filtering apparatus for laboratory filtering of liquids by sucking up the liquid through a filter. The apparatus has been provided for the purpose of permitting rapid filtering of liquids at routine analyses in connection with continuous production, for instance at the determination of the sugar content in sugar beets delivered to sugar factories.

The filtering apparatus provided by the present invention is characterized in that the filter is a compressed cellulose cartridge pushed into a suction nozzle which can be optionally connected to vacuum or pressure for sucking liquid through the filter cartridge at filtering or for blowing the filter cartridge out of the nozzle after finished filtering. A filtering apparatus of this type can readily be automatized inasmuch as the filter cartridge can be exchanged without manual interference with the aid of a program-controlled automatic mechanism for controlling the movement of the nozzle and the application of vacuum or pressure in said nozzle. With the present status of the automation techniques this does not involve any difficulties. In addition such filtering apparatus is particularly economical in use since the filter cartridge consists of an inexpensive material and the use of glass utensils for carrying out the filtering operation is reduced to a minimum, as is the associated dish-washing work.

The invention also incorporates a method of manufacturing a filter cartridge for such filtering apparatus, a filter cartridge manufactured by said method, and a mold for carrying out the method.

For better elucidation the invention will be more fully described in the following with reference to the accompanying drawings in which:

FIG. 1 is a diagrammatic view of the filtering apparatus provided by the present invention;

FIG. 3 is a diagrammatic view of a mold for manually manufacturing the filter cartridge to be used in said filtering apparatus;

FIG. 4 is a side view of a machine for the continuous manufacture of filter cartridges; and FIG. 5 is a partial plan view of said machine.

Figure 2:
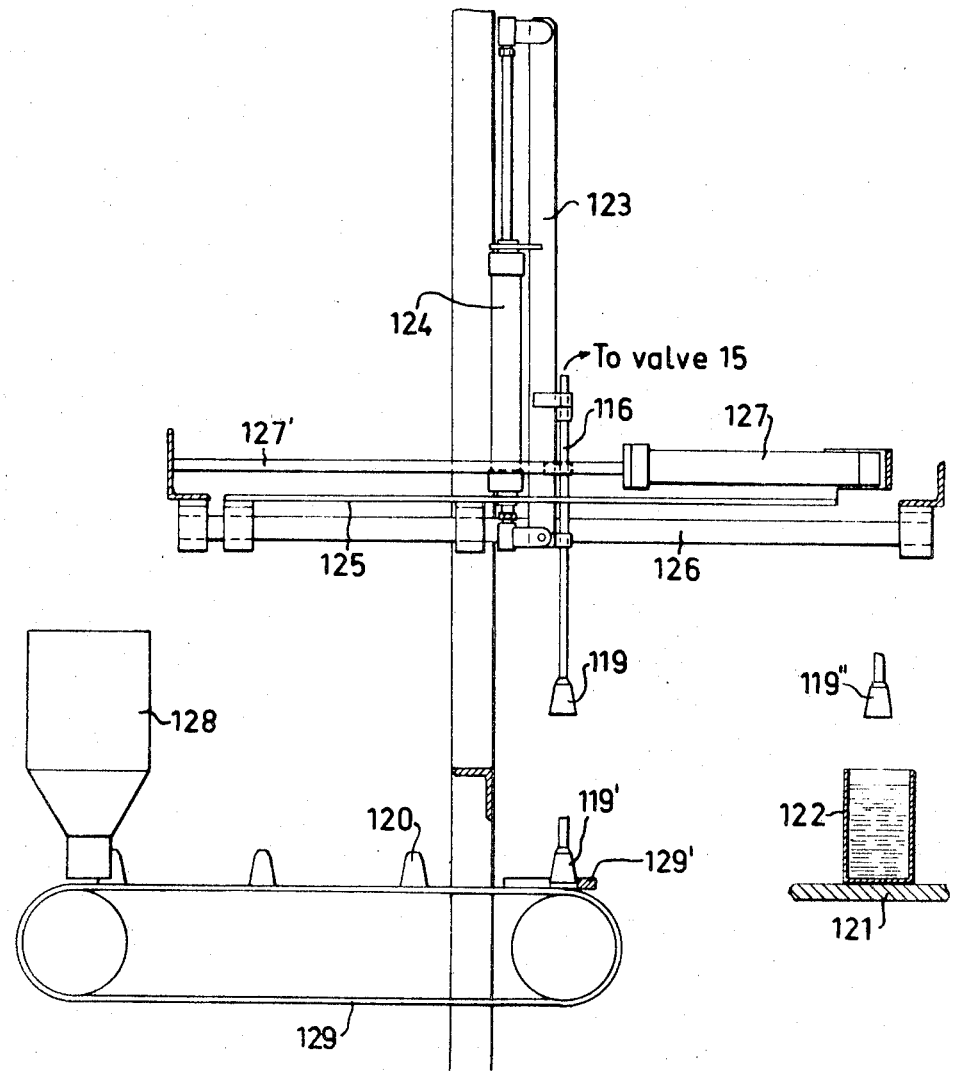
FIG. 2 is a side view, partly in vertical section, of a constructional embodiment of the nozzle arrangement in said filtering apparatus.

The filtering apparatus shown in FIG. 1 comprises a receptacle 10 which at the top is connectible via a valve 11 to a compressed air line 12 and via a valve 13 to a suction line 14, while it is connectible at the lower end via a valve 15 to one end of a hose 16 and via a valve 17 to a line 18. At the other end the hose 16 has a funnel-shaped nozzle 19 with a filter cartridge 20 inserted therein. This filter cartridge consists of cellulose, such as sulfite or sulfate cellulose or a mixture thereof, and can be prepared in the manner described below in connection with FIGS. 3–5.

For automatisation of the use of the filtering apparatus the nozzle 19 can be supported by a member to which is imparted both horizontal and vertical movements (indicated by the arrows in FIG. 1) in order that the nozzle may be moved between a position above a base 21 and may permit being lowered towards said base, and a position above a cup 22 and may permit being lowered into said cup. Further, the valves may be solenoid valves which are opened and closed by a program mechanism in coordination with said movements of the nozzle.

For the description of the function of the filtering apparatus it is assumed that the nozzle 19 occupies the position shown in FIG. 1 by full lines, that the cup 22 contains liquid while the receptacle 10 is empty, and that all valves are closed. The nozzle 19 with the filter cartridge 20 is now lowered into the liquid in the cup 22 to the position shown by dash lines 19′, and valves 13 and 15 are opened. Liquid is sucked from the cup 22 through the filter cartridge 20 and the filtrate collects in the receptacle 10. After a predetermined time or at a predetermined level in the receptacle 10 valves 13 and 15 are again closed while valves 11 and 17 are opened instead, so that the filtrate is urged under the action of compressed air supplied to the receptacle 10 into the line 18 to be forwarded to an analysing or like apparatus which can also be of automatic operation. After the receptacle has been emptied valve 17 is closed whereupon valve 15 is again opened so that compressed air enters the hose 16 and the nozzle 19 for ejection of the spent filter cartridge 20 from the nozzle 19. This can take place while the nozzle is over the cup 22 or after the nozzle has been moved to a particular cartridge ejecting station. After closure of valves 11 and 15 the empty nozzle is moved to position 19″ over the base 21 and is pressed down over a filter cartridge 20′ placed on said base. When the nozzle 19 is then returned to position 19′, after the cup, which earlier supplied liquid to the filtering apparatus, has been removed therefrom and exchanged for a new cup containing liquid (all this can be performed by known automatic means), the filter cartridge 20′ is carried along by the nozzle as it is retained therein under slight interference fit, possibly supported by suction in the nozzle in that valves 13 and 15 are kept open while the nozzle is moved from base 21 to position 19′.

The constructional embodiment of the filtering apparatus according to the present invention, which is shown in FIG. 2, includes a pipe 116 which is vertical and at its lower end has a funnel-shaped widened portion 119, while it is assumed that pipe 116 has its upper end connected to valve 15 in FIG. 1 and via said valve to the system of receptacles otherwise illustrated in FIG. 1 and which can be incorporated in a polarimeter device for sugar content determination. Pipe 116 is arranged on and supported by a bar 123 which is vertically reciprocable by means of a double-acting air cylinder 124 which in turn is carried by a sliding carriage 125 horizontally movable on guide means 126. Travel of carriage 125 is realized by a double-acting air cylinder 127 which is connected with the carriage 125 and the piston rod 127' of which is connected to the guide means 126.

For each sample sucked up by the filtering apparatus use is to be made of a new filter cartridge, and such cartridges emerge from a supply 128 from which the filter cartridges 120 are fed by means (not shown) one at a time onto a belt conveyor 129. The filter cartridges travel on the conveyor 129 in upright position to an abutment 129' where the filter cartridges arrange themselves in a row. When pipe 116 occupies the FIG. 2 position and carriage 125 is retracted to the FIG. 2 position, pipe 116 is vertically lowered by the cylinder 124 so that the funnel-shaped widened portion 119 arrives at position 119' and is passed over a filter cartridge 120 arrested by the abutment 129'. The filter cartridge will stick in the funnel-shaped widened portion 119 and as the direction of motion of the cylinder 124 is then reversed the filter cartridge is taken along in the upward movement of pipe 116. Carriage 125 is then moved by cylinder 124 to the right as viewed in FIG. 2 so that the funnel-shaped widened portion 119 with the filter cartridge therein will arrive at the FIG. 2 position 119''. The filtering apparatus is now in position to permit being lowered into a can 122 located on a base 121. The movements of pipe 116 necessary for sucking up filter cartridges can be controlled in a known manner by a program device. After the desired quantity of liquid has been sucked up from the can under filtering thereof, the spent filter cartridge can be ejected into the can in the manner described in connection with FIG. 1.

The filter cartridge can be manufactured in a rational manner by the use of the mold shown in FIG. 3, which includes an upper mold part 30 and a lower mold part 31 which is inserted in the first mold part 30 and defines with said mold part a chamber 32, a packing 33 providing a seal between the mold parts. The mold part 30 forms a mold cavity 34 which conically tapers in a downward direction from an upper cylindrical portion, and a recess 35 concentrically surrounding the mold cavity 34 at the upper open end thereof. A plunger 36 can be introduced into the cylindrical portion of the mold cavity, and the depth of introduction is restricted to the cylindrical part of the mold cavity by a shoulder 36a. Provided in the mold part 30 is a passage 37 which is in permanent communication with the chamber 32, and a passage 38 connected to a line 39 which is optionally connectible over a four-way valve 40 to a compressed air line 41, a line 42 opening into the atmosphere, and a suction line 43. Arranged in the mold part 31 is a discharge passage 44 which is connected to a discharge conduit 42 having a shut-off valve 46.

The filter cartridge is manufactured as follows: Cellulose, such as sulfite or sulfate cellulose or a mixture of both, is introduced into the mold cavity 34 and water is supplied to the recess 35 while the line 39 through valve 40 is kept connected to the suction line 43 and the valve 46 is closed so that vacuum is maintained in the chamber 42 which then functions as a suction box. Under continued suction of water from the cellulose to chamber 35 the plunger 36 is introduced into the mold cavity in order that the cellulose shall be compresesd to the desired density. After finished compression the plunger is reacted, the vacuum in chamber 32 is relieved in that line 39 is connected to atmosphere by adjustment of valve 40, simultaneously as valve 46 is opened for discharge of the water from chamber 32, which has been separated from the cellulose. Valve 46 is then closed again simultaneously as valve 40 is connected to the compressed air line 41 so that chamber 32 is placed under pressure for ejection of the resulting filter cartridge 20 from the mold cavity. The filter cartridge is then dried and then is ready for use in the filtering apparatus described.

The machine, illustrated in FIGS. 4 and 5, for continuous manufacture of filter cartridges by the method according to the invention comprises a wheel having a wheel rim 130 connected by spokes 147 to a hub 148 which is rotatable on a tubular bearing 149 and connected in a manner not shown to a drive for causing the wheel formed by elements 130, 147 and 148 to rotate. Arranged in the wheel rim 130 is a number of peripherally distributed mold cavities 134 each of which is in communication through a pasasge 150 located in a spoke with the internal circumferential surface of the bearing 148. It is assumed that the tubular bearing 149 is connected to sitable evacuating means and has a short slot 151 and a long slot 152 for attaining communication between each pasasge 150 and the associated mold cavity 134 and the interior of the bearing 149 during predetermined sections of the path of movement of each mold cavity at the rotation of the wheel. Besides, there is arranged within the bearing 149 a line 150 which in a manner not shown is connected to a source of compressed air and is connectible via a slot 154 in the bearing 149 to each pasasge 150 when the latter is in vertical position with the associated mold cavity facing downwardly. The wheel 134, 147, 148 is intermittently rotatable by means (not shown) in increments squal to the angular distances between the mold cavities 134.

For continuous supply of cellulose to the mold wheel described a roll of cellulose 155 is rotatably mounted in a frame 156, the rotation of the roll being restrained to a certain extent by a friction brake 157 which is applied against the roll shaft. From the roll 155 a cellulose web 158 passes over a return roller 159 to a nozzle 160 with a successively tapering mouth in which the cellulose web 158 is folded or crinkled into substantially cylindrical cross sectional shape so that the flat cellulose web 158 leaves the nozzle 160 approximately in the form of a rope 158'. Said rope passes between a pair of pressure rolls 161 which exert traction on the rope 158' for pulling forth the web 158 from the roller 155 and which to this end can be knurled or otherwise made rough on their surfaces contacting the rope 158'. Following upon the rolls 161 is a knife 163 which is reciprocable by means of a pneumatic cylinder 162 for cutting the rope 158' into short lengths 158'' according as the rope is advanced. On a stationary base 164 of U-shaped cross-section these rope lengths are moved into the peripheral surface of the mold wheel by the rope 158' which is advanced intermittently by the rollers 161 in synchronism with the continuous rotation of the mold wheel such that the rope lengths 158'' in turn of order are pushed onto the mold wheel over the mold cavity momentarily facing straight upwards. Above the mold wheel and opposite said mold cavity is arranged a pneumatic cylinder 165, and the piston rod of said cylinder has the projecting free end shaped as a plunger 166 for pressing into said mold cavity the rope length 158' which lies on the peripheral surface of the mold wheel and extends over the upwardly facing mold cavity. A pipe 167 which forms a nozzle directed towards said mold cavity and connected to a water conduit is located adjacent the mold wheel to permit pouring water onto the cellulose introduced into the mold cavity.

During the intermittent rotation of the mold wheel new mold cavities are moved in turn of order into position opposite the plunger 166 to permit pressing a supplied rope length 158'' of cellulose thereinto and subsequent pouring of water onto the cellulose while the mold cavity which has been filled with cellulose will enter into communication during its continued movement with the interior of the tubular bearing 149 via the slot 152 for sucking water from the cellulose while simultaneously pressing it into the mold cavity under the pressure acting from outside. After two steps the filled mold cavity has arrived in position opposite a pneumatic cylinder 168 the piston rod of which at the free end has a plunger 136 with a shoulder 136a thereon. Said plunger is introduced into the mold cavity 134 by the pneumatic cylinder 168 for compressing the cellulose therein in the manner described in connection with FIG. 3, while water is simultaneously sucked out of the mold cavity through the slot 152. The sucking of water out of the mold cavity proceeds also in the next position, but when the mold cavity with the plug of cellulose pressed thereinto arrives in vertically downwardly facing position it is connected to the compressed air line 153 via the slot 154 for ejection of the resulting plug onto a belt conveyor 169. This belt conveyor carries the resulting cellulose plugs through a drying oven 170 from which they are delivered in a finished state.

During the intermittent return to vertically upwardly facing position the empty mold cavity moves past a pipe 171 having a nozzle which is directed towards the mold cavity in normal position just ahead of the vertically upwardly facing position in order to spray water into the mold cavity. Simultaneously with said spraying, water can be sucked out in that the mold cavity is in communication via the slot 151 with the interior of the tubular bearing 149 so that the mold cavity and the associated passage 150 are flushed, but one can also have the mold cavity partly filled with water while the communication with the interior of the bearing is kept closed, in order that this water may serve to moisten the cellulose at the later introduction thereof into the mold cavity.

What I claim and desire to secure by Letters Patent is:

1. A laboratry filtering means for consecutive filtering of successively supplied samples of liquids, comprising a storage for filters, conveying means for conveying the filters to a pick up station for successively picking up said filters one at a time by means of a pipe having a widened portion as a filter holder the shape of which conforms to the shape of said filters, means for moving said pipe vertically and horizontally between said pick up station and a filtering station and vice versa at which filtering station the filter holder is immersed into one of a series of liquor samples, consecutively supplied to said filtering station, said pipe further being optionally connectible to vacuum for the filtering process and to pressure for ejecting the filter used after filtering of said one sample.

2. A laboratory filtering means as claimed in claim 1 wherein said filters have the form of a cylindrical, slightly conical body made of compressed cellulose, the diameter of said filters preferably being smaller than their height.

References Cited

UNITED STATES PATENTS

| | | | |
|---|---|---|---|
| 1,472,896 | 11/1923 | Alsop | 210—406 |
| 2,533,149 | 12/1950 | Stang | 210—406 X |
| 2,802,405 | 8/1957 | Krogel | 162—224 X |
| 3,215,500 | 11/1965 | Bittner | 210—496 X |

JOHN W. ADEE, Primary Examiner

U.S. Cl. X.R.

210—416, 496, 500